(12) United States Patent
Palanichamy et al.

(10) Patent No.: US 10,198,575 B2
(45) Date of Patent: Feb. 5, 2019

(54) AUTO-SANDBOXING WEBSITE OR PARTS OF WEBSITE IN BROWSER TO PROTECT USER PRIVACY AND SECURITY

(71) Applicant: Qualcomm Innovation Center, Inc., San Diego, CA (US)

(72) Inventors: Kulanthaivel Palanichamy, San Diego, CA (US); Enrico Ros, San Diego, CA (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 226 days.

(21) Appl. No.: 15/240,930

(22) Filed: Aug. 18, 2016

(65) Prior Publication Data
US 2018/0052992 A1 Feb. 22, 2018

(51) Int. Cl.
G06F 21/53 (2013.01)
H04L 29/08 (2006.01)

(52) U.S. Cl.
CPC .............. G06F 21/53 (2013.01); H04L 67/02 (2013.01)

(58) Field of Classification Search
CPC ................................ G06F 21/53; H04L 67/02
See application file for complete search history.

(56) References Cited

U.S. PATENT DOCUMENTS

| | | | | |
|---|---|---|---|---|
| 8,464,318 B1* | 6/2013 | Hallak | ................ | H04L 63/1416 726/4 |
| 2010/0017880 A1* | 1/2010 | Masood | ................... | G06F 21/51 726/24 |
| 2010/0115585 A1* | 5/2010 | Cohen | ..................... | G06F 21/53 726/3 |
| 2010/0192224 A1* | 7/2010 | Ferri | ....................... | G06F 21/53 726/23 |
| 2011/0307955 A1* | 12/2011 | Kaplan | ............... | H04L 63/0227 726/23 |

* cited by examiner

Primary Examiner — Joseph P Hirl
Assistant Examiner — Kalish K Bell
(74) Attorney, Agent, or Firm — Neugeboren O'Dowd PC

(57) ABSTRACT

Methods and devices for processing web content are disclosed. The method may include receiving a webpage with a browser and parsing the webpage with the browser to obtain subcomponents from the webpage. The browser identifies whether there is an indication that one or more subcomponents of the webpage are potentially malicious, and when there is an indication that the one or more subcomponents of the webpage are malicious, the browser loads the one or more of the subcomponents of the webpage in an auto-sandbox instance for isolated execution by the browser.

17 Claims, 7 Drawing Sheets

AUTO-SANDBOXING WEBSITE OR PARTS OF WEBSITE IN BROWSER TO PROTECT USER PRIVACY AND SECURITY

FIELD OF THE INVENTION

The present invention relates to web browsing devices. In particular, but not by way of limitation, the present invention relates to apparatus and methods for protecting user privacy and security in the context of a web browser.

BACKGROUND OF THE INVENTION

Computing devices such as smartphones, netbooks, gaming devices, PDAs, desktop computers, televisions, and laptop computers are now ubiquitous. A common use for these types of devices is browsing webpages utilizing the Internet. Existing versions of hypertext markup language (e.g., HTML5) provide a rich set of application programming interfaces (APIs) to access a user's private and sensitive information easily, and in many instances, the responsibility for security is shifted to the users.

In addition, uniquely identifiable user information and browsing behaviors are increasingly being tracked by a collection of methods known as "ever-cookies," and these methods use several Web-standard APIs to store persistent information that is accessible across websites. Currently there is no effective solution to protect users from tracking using ever-cookies.

Moreover, ad-publishing platforms are increasingly using browser fingerprinting techniques to uniquely identify users with low bits of entropy, and modern browsers do little, if anything, to prevent fingerprinting currently.

Adblock and other similar add-ons provide very limited protection from trackers and malicious web contents by using crowd-sourced curated lists. But malicious websites can circumvent these measures easily.

Although process based sandbox architectures in web browsers may take advantage of protected memory and restricted permissions given to the render process by the underlying operating system, they still allow websites to access sensitive information via standard HTML APIs.

Private and incognito browsing options provide some protection against information theft, but the user must opt-in, and the private browsing applies to the entire tab/window. Even private browsing is susceptible to fingerprinting and phishing attacks.

Chrome safe-browsing, XSS auditor, third-party cookie blocking, first-party origin policy, and other currently available security measures provide very limited protection from malicious content. Moreover, some of these measures rely on user intervention.

Legitimate websites may have compromised third-party contents that the websites have no control whatsoever. These legitimate sites can gain user's trust easily, but can compromise their privacy and security unknowingly.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

According to an aspect, a method for processing web content on a computing device is disclosed. The method includes receiving a webpage with a browser, parsing the webpage with the browser to obtain subcomponents from the webpage, and identifying, with the browser, whether there is an indication that one or more subcomponents of the webpage are potentially malicious. When there is an indication that the one or more subcomponents of the webpage are malicious, the one or more of the subcomponents of the webpage are loaded in an auto-sandbox instance for isolated execution by the browser.

According to another aspect, a computing device is disclosed. The computing device includes a web browser configured to receive a webpage and prepare a composite view of the webpage for display to a user. The web browser includes a parser configured to parse the webpage to obtain subcomponents from the webpage, a platform application programming interface (API) configured to provide plurality of entry points to access services and receive events, and at least one detection component configured to generate an indication that one or more subcomponents of the webpage are potentially malicious. A sandbox filter is disposed to intercept calls made by subcomponents of the webpage to the platform API, and the sandbox filter is configured to expose interfaces to the detection component to enable the detection module to receive browser activity information. The computing device also includes an auto-sandbox module configured to load the one or more of the subcomponents of the webpage in an auto-sandbox instance for isolated execution by the browser when there is an indication that the one or more subcomponents of the webpage are malicious.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

According to an aspect, embodiments disclosed herein prevent trackers and malicious websites from accessing privacy and security-sensitive data on a computing device by automatically sandboxing websites or subcomponent parts of websites (e.g., sub-frames) with a reduced privilege level.

Embodiments disclosed herein provide a comprehensive security barrier between a website and a web browser so that potentially vulnerable web standard APIs, storage and sensor events will be made accessible only through a sandbox barrier.

In some embodiments, sandbox security levels and privileges are automatically determined based on the level of threat posed by the website. Moreover, sub-frames within a website may be sand-boxed independent of the main-frame. As described in more detail herein, threat notifications may be received from multiple detection sources such as cross-site scripting (XSS) auditor, canvas fingerprint detector, cookie tracking detector, etc. Embodiments may be transparent to users without shifting security responsibility to the users so that a seamless secure browsing experience is provided without breaking websites.

Figure 1:
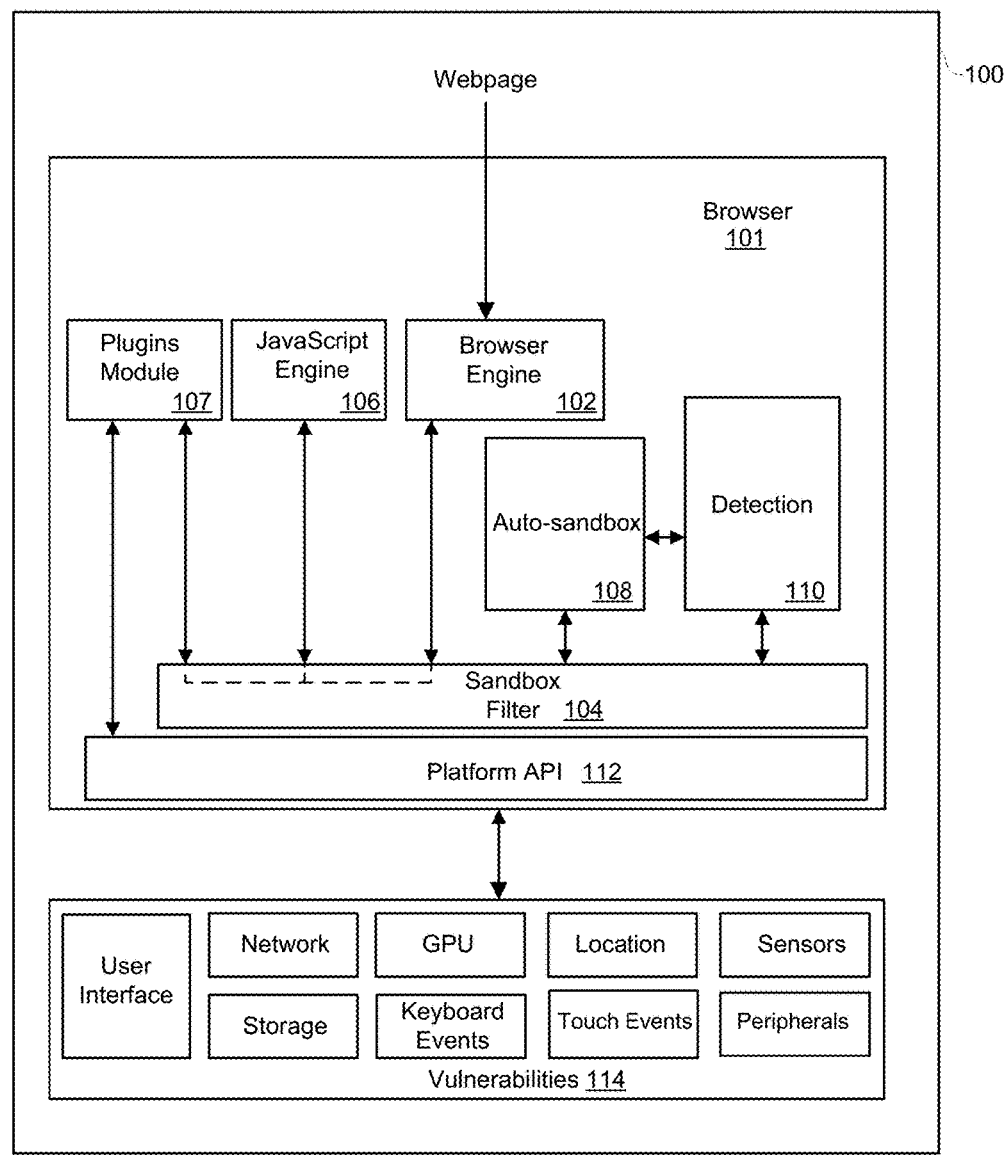
FIG. 1 is a block diagram depicting an exemplary embodiment of a computing device.

Referring first to FIG. 1, it is a block diagram depicting an embodiment of an exemplary computing device 100. As shown, the computing device 100 includes a browser 101 that is disposed and configured to receive web data (e.g., a webpage) from a web application, render the web data, and composite the web data on a display of the computing device (not shown). As shown, the browser 101 includes a browser engine 102 that is coupled to a sandbox filter 104, and the browser engine 102 is coupled to a JavaScript engine 106 and plugins module 107 via the sandbox filter 104. The sandbox filter 104 is also coupled to an auto-sandbox module 108, a detection component 110, and a platform application programming interface (API) 112. As depicted, the plugins module 107 is also coupled to the API 112 without communicating through the sandbox filter 104. Also shown in FIG. 1 is a non-exclusive depiction of vulnerabilities 114 that may exist on the computing device 100. As one of ordinary skill in the art will appreciate, the JavaScript engine 106 may include a JavaScript parser and interpreter to parse and execute JavaScripts.

The depiction of the components in FIG. 1 is logical and is not intended to be an actual hardware diagram. For example, the division of the browser 101 into the depicted components is for exemplary purposes only, and as discussed further herein, each component may be further separated into constituent components, but it should also be recognized that the components may be integrated to such an extent that each component may not be separately recognizable in actual implementation.

In the embodiment depicted in FIG. 1, for example, the sandbox filter 104 logically depicts components that are built in connection with the browser engine 102 at various places where services are accessed (e.g., to enable the sandbox filter 104 to intercept requests and create a barrier from the vulnerabilities 114). And the auto-sandbox module 108 logically depicts components that are associated with sandboxing one or more subcomponents of a webpage and the logical decision making to determine whether or not to sandbox the one or more of the subcomponents of the webpage. But the auto-sandboxing features and functionality described herein may be implemented by more than two discrete constructs that may be separated or combined in a variety of different manners. In addition, one of ordinary skill in the art, in view of the present disclosure, will appreciate that the components depicted in FIG. 1 may be realized by hardware, hardware in connection with software, and/or firmware.

According to an aspect, the depicted browser 101 prevents trackers and malicious web content from accessing or adversely affecting the vulnerabilities 114 by automatically sandboxing webpages or subcomponent parts of webpages (e.g., sub-frames) with a reduced privilege level. More specifically, the browser 101 includes the sandbox filter 104, which (as described above) provides a security barrier between a webpage and the vulnerabilities 114 of the computing device 100 so that web standard APIs, storage, and sensor events will be made accessible only through the sandbox filter 104.

The sandbox filter 104 may be built into the browser engine 102 at various places where services are accessed, and it exposes interfaces of the browser engine 102 to the detection component 110, which generally functions to produce an indication (or indications) that one or more subcomponents of the webpage pose a threat because they are potentially malicious. The auto-sandbox module 108 is configured to load the one or more of the subcomponents of the webpage in an auto-sandbox instance for isolated execution when it receives an indication (from one or more modules of the detection component 110) that the one or more subcomponents of the webpage are malicious. One of ordinary skill in the art in view of this disclosure will appreciate that an auto-sandbox instance may include access filters, sandboxed storage and sandboxed memory. An auto-sandbox instance may choose to load components in an auto-sandbox instance, but this does not always occur.

In some implementations, when the auto-sandbox module 108 has sandboxed a webpage (or a frame of the webpage), all the persistent storage (e.g., cookie storage and HTML5 storage) are sandboxed for that specific website/frame. Sandboxed storage items are only available to the current page session and subsequent page sessions with the same first-party domain on the same tab/window. In addition, to prevent fingerprinting and keylogging, the auto-sandbox module 108 may salt or throttle the following operations: canvas read backs; keyboard events; and touch events.

The browser engine 102 in this embodiment is configured (among other functions) to: load resources associated with a webpage and parse the hyper-text markup language (HTML) of the webpage to create a document object model (DOM) tree. As discussed further herein, the browser engine 102 may be realized by modifying an existing browser engine (e.g., a modified Webkit engine) to be closely integrated with the sandbox filter 104, the auto-sandbox module 108, and the detection component 110.

The depicted JavaScript engine 106 is configured to execute JavaScript code that may be a part of web content received by the browser. The JavaScript engine 106 may be realized by known engines such as just-in-time (JIT) compilers that may interpret and/or execute compiled code.

In many embodiments, the sandbox filter 104 is coupled to the browser engine 102 and JavaScript engine 106 so that access points that are incoming to the browser 101 (e.g., push events) and access points that the browser 101 may access (e.g., services pulled by the browser engine 102) are monitored. Examples of push events include touch events and accelerometer information that may be fed to the browser engine 102 from the operating system. Pull requests may include requests to access a camera, phonebook, or location data.

In the exemplary embodiment, the browser 101 resides in user space of the computing device 100, and as one of ordinary skill in the art will appreciate, the browser 101 communicates with an operating system (not shown) of the computing device 100 with system calls. Because the sandbox filter 104 and the auto-sandbox module 108 are built into the browser 101, the context of any system call made to the operating system is known. For example, a distinction between a main webpage and a third party subcomponent (e.g., a third party script) within the webpage may easily be made by the sandbox filter 104 in connection with the auto-sandbox module 108. In this way, the auto-sandbox module 108 may differentiate permissions to grant some access permissions to some subcomponents of a webpage (e.g., portions of a main webpage) while denying permissions to other subcomponents of a webpage (e.g., a specific script that originates from a third party). Thus, operating system calls made by one or more subcomponents of the webpage may be intercepted by the browser 101 itself to prevent access to a vulnerable portion (e.g., one or more of the vulnerabilities 114) of the computing device 100.

In addition to parsing the web content, the browser engine 102 transforms received objects into a raster. For example, the browser engine 102 transforms bitmap graphics, vector graphics and text that make up a webpage into a raster that can be displayed on screen. A typical webpage may have more than 150 objects to render, which may include one or more backgrounds, scripting-language objects (e.g., JavaScript), HTML objects, CSS objects, JPEGs, PNGs, and video objects. Many of these subcomponents may be maliciously designed to attempt to obtain access to or affect the vulnerabilities 114. According to aspects disclosed herein, subcomponents of a webpage (e.g., one or more sub-frames) may be selectively sandboxed based upon a potential threat that each subcomponent presents to the vulnerabilities 114.

Figure 6:
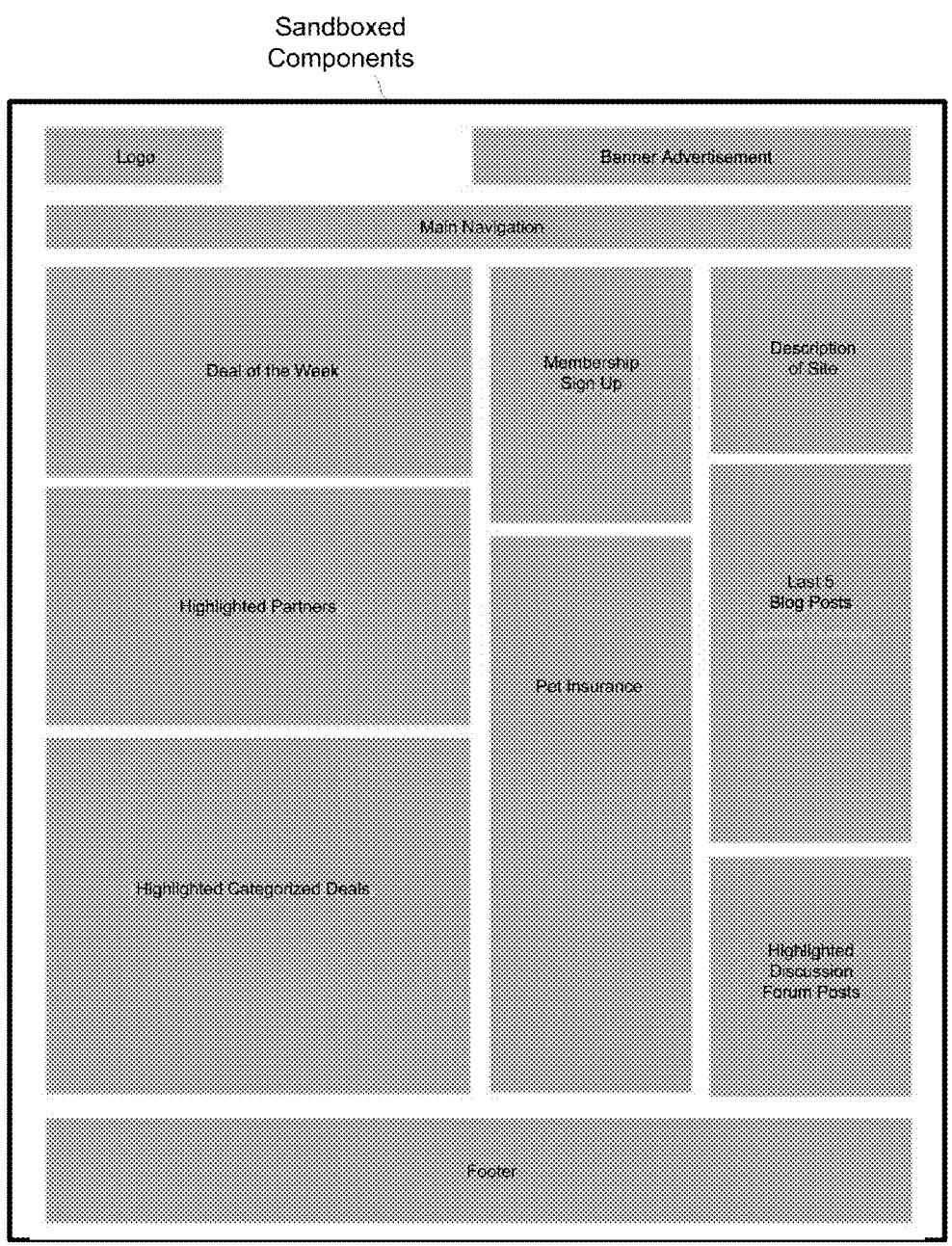
FIG. 6 depicts exemplary constituent subcomponents of a webpage.
Figure 7:
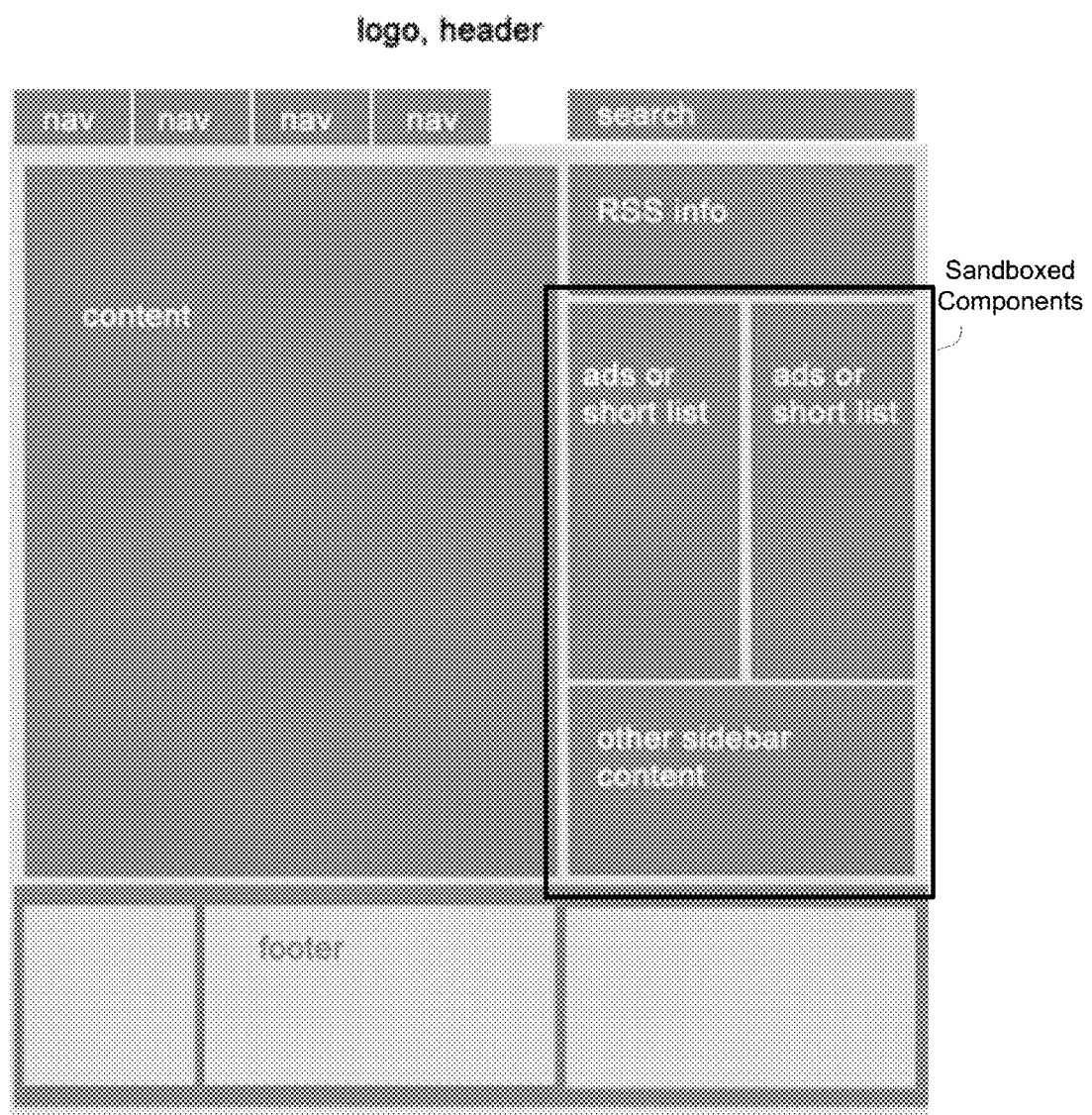
FIG. 7 depicts the constituent subcomponents of another webpage.

Referring briefly to FIG. 6 for example, shown is an example where a sandboxed area of a webpage is the entire webpage so execution of all the subcomponents of the webpage is isolated during execution. In contrast, FIG. 7 depicts an example where the sandboxed area is only some of the subcomponents (e.g., advertising-related sub-frames) of a webpage are sandboxed to execute in isolation. The remaining benign subcomponents may be loaded into a non-isolated memory space for unfiltered execution so the benign subcomponents are not isolated while executed.

It should be recognized that the vulnerabilities 114 are certainly not limited to those depicted in FIG. 1. It should also be recognized that the auto-sandbox module 108 may be configured to grant or revoke permission for a variety of different types of actions and requests. For example, the auto-sandbox module 108 may be configured to grant or revoke permission for: specific URL schemes (e.g., hypertext transfer protocol (HTTP), secure HTTP (HTTPS), WebSocket, file://, etc.); access to a local HTTP cache on a computing device; for popups and open uniform resource locators (URLs) in new tab/window; to read/write cookies; to access browsing history; for just-in-time (JIT) compilation of JavaScript; for HTML5 storage (Session, Local, Database and IndexedDB); for device APIs (including but not limited to vibration, battery status, HTML media capture, proximity, ambient light, network service discovery, and wake lock); access to geolocation data; to Web performance APIs (e.g., timing and high resolution timer); to WebRTC APIs (media capture, mediastream, recording and capture, screen capture, etc.); to download contents into the computing device; to handle WTA intents (dial, make call, send DTMF tones); and to link market app store (e.g. GOOGLE play store).

Figure 2:
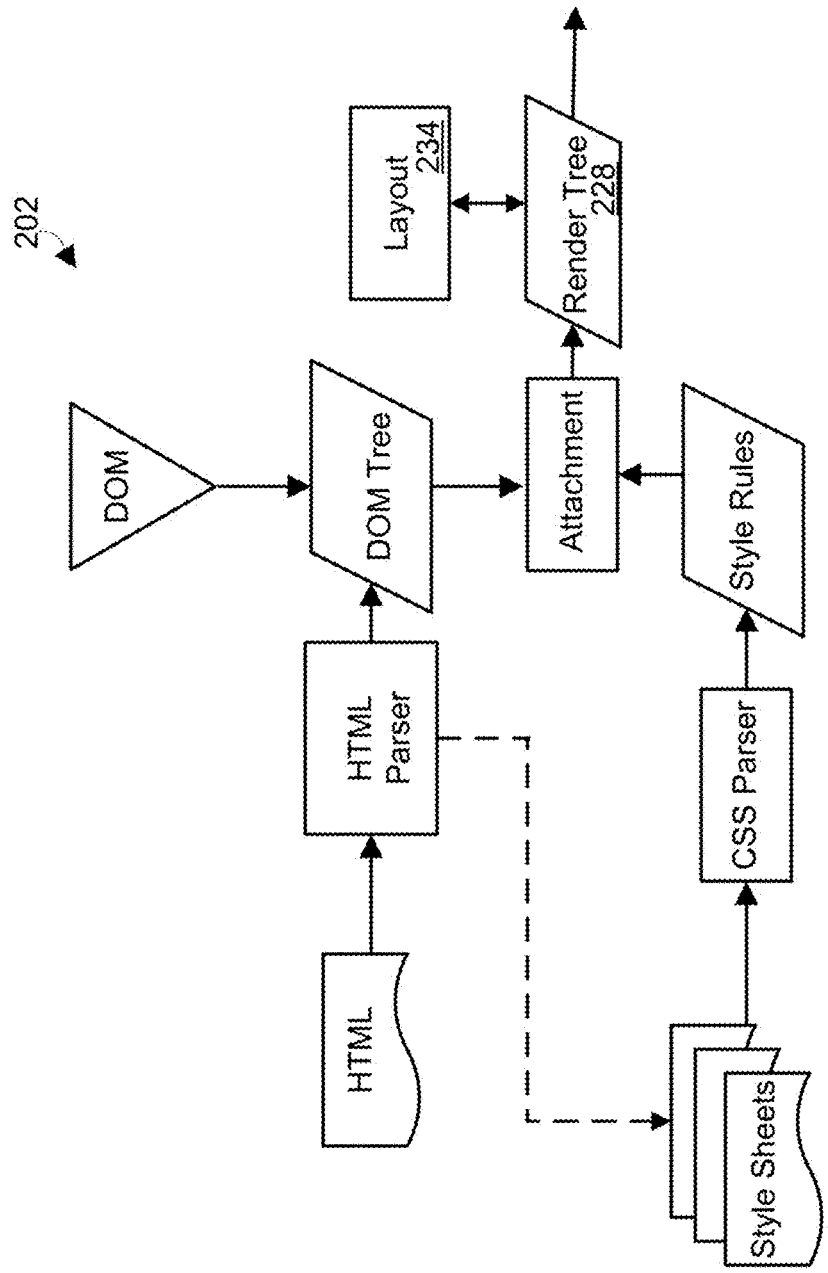
FIG. 2 is a block diagram depicting an exemplary embodiment of the browser engine depicted in FIG. 1.

Referring next to FIG. 2, it is a block diagram depicting an exemplary embodiment of a browser engine 202 that may be used to implement the browser engine 102 depicted in FIG. 1. As shown, the browser engine 202 in this embodiment includes components from a Webkit engine, but this is certainly not required, and other rendering components may be utilized. The functions of each component of the exemplary browser engine 202 are well known, and as a consequence, the details of the function and interoperation of each component is not included herein. But in general, the browser engine 202 receives webpage components and renders the subcomponents in pixel form.

Again, the depicted arrangement of components in FIG. 2 is exemplary only, and one of ordinary skill in the art, in light of this disclosure, will appreciate that different web browser configurations may be utilized without departing from the scope of the present invention. Although not separately depicted for convince, in addition to the HTML parser and CSS parser, the browser engine 102 may include an extensible markup language (XML) parser.

Figure 3:
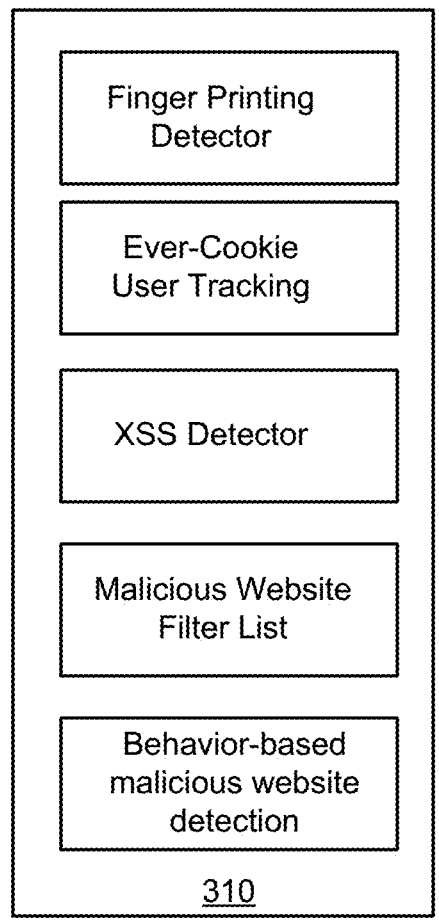
FIG. 3 is a block diagram depicting an exemplary embodiment of the detection component depicted in FIG. 1.

Referring next to FIG. 3, shown is a block diagram depicting an exemplary detection component 310 that may be used to realize the detection component 110. As shown, the detection component 310 in this embodiment includes a plurality of detection modules incorporated into the browser 101 including a finger printing detector; an ever-cookie user tracking module; an XSS detector; a malicious website list; and a behavior-based malicious website detector. The technology utilized in each of the modules may be a known detection technology that provides a respective indication of whether one or more sub components (e.g., one or more a sub-frames) or the entire webpage of a website are potentially malicious.

According to an aspect, the auto-sandbox module 108 may receive and analyze the outputs from the detection modules to determine whether one or more of the subcomponents of the webpage should be sandboxed to be loaded in an auto-sandbox instance for isolated execution by the browser 101. In some instances, a single output from the collective outputs of the detection module 110 may be determinative of whether or not to sandbox a subcomponent.

For example, when the malicious website list indicates that a resource (e.g., a JavaScript) requested by a sub-frame resides at a third party website, regardless of whether the other detection modules indicate the sub-frame may be malicious, the auto-sandbox module 108 may sandbox the sub-frame to prevent the http-get request from occurring. In other instances, the outputs of the detection modules may be weighted so that the auto-sandbox module 108 will determine whether or not to sandbox a portion of a webpage based upon a collective analysis of the weighted outputs from the detection modules.

Figure 4:
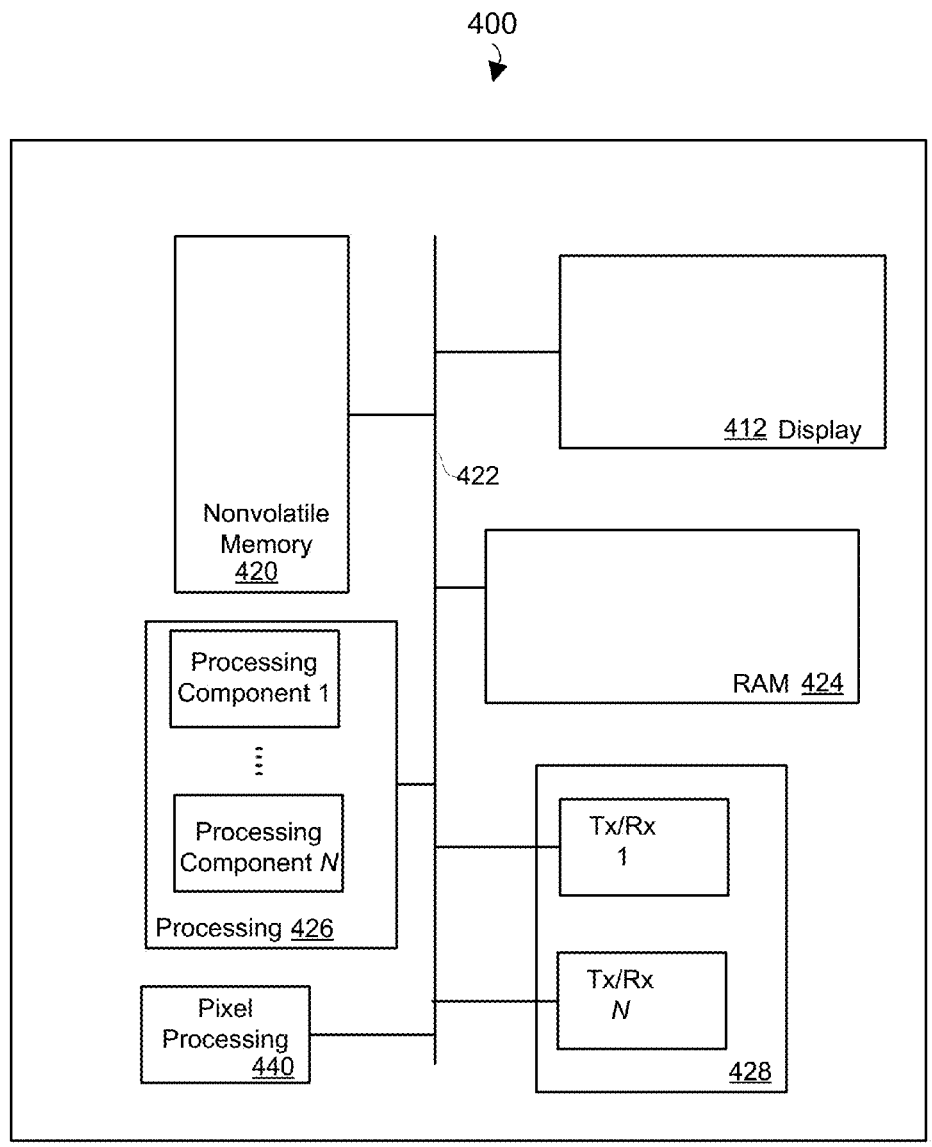
FIG. 4 is a block diagram depicting physical components of an exemplary computing device.

Referring next to FIG. 4, shown is a block diagram depicting physical components of an exemplary computing device 400 that may be utilized to realize the computing device 100 described with reference to FIG. 1 and the browser engine 202 depicted in FIG. 2. As shown, the computing device 400 in this embodiment includes a display portion 412, and nonvolatile memory 420 that are coupled to a bus 422 that is also coupled to random access memory ("RAM") 424, a processing portion (which includes N processing components) 426, a transceiver component 428 that includes N transceivers, and a pixel processing component 430. Although the components depicted in FIG. 4 represent physical components, FIG. 4 is not intended to be a hardware diagram; thus many of the components depicted in FIG. 4 may be realized by common constructs or distributed among additional physical components. Moreover, it is certainly contemplated that other existing and yet-to-be developed physical components and architectures may be utilized to implement the functional components described with reference to FIG. 4.

This display portion 412 generally operates to provide a presentation of content to a user, and in several implementations, the display is realized by a touchscreen display, but any of a variety of different types of displays may be utilized.

In general, the nonvolatile memory 420 functions as non-transitory, tangible, processor-readable medium to store (e.g., persistently store) data and executable code including code that is associated with the functional components depicted in FIGS. 1 and 2. In some embodiments for example, the nonvolatile memory 420 includes bootloader code, modem software, operating system code, file system code, and code to facilitate the implementation of one or more portions of the sandbox filter 104 and the auto-sandbox module 108 discussed with reference to FIG. 1 as well as the other web browser components described with reference to FIGS. 1 and 2.

In many implementations, the nonvolatile memory 420 is realized by flash memory (e.g., NAND or ONENAND™ memory), but it is certainly contemplated that other memory types may be utilized as well. Although it may be possible to execute the code from the nonvolatile memory 420, the executable code in the nonvolatile memory 420 is typically loaded into RAM 424 and executed by one or more of the N processing components in the processing portion 426.

The N processing components in connection with RAM 424 generally operate to execute the instructions stored in nonvolatile memory 420 to effectuate the functional components depicted in FIGS. 1 and 2. As one of ordinarily skill in the art will appreciate, the processing portion 426 may include a video processor, modem processor, DSP, graphics processing unit (GPU), and other processing components.

The depicted transceiver component 428 includes N transceiver chains, which may be used for communicating with external devices via wireless networks. Each of the N transceiver chains may represent a transceiver associated with a particular communication scheme.

Figure 5:
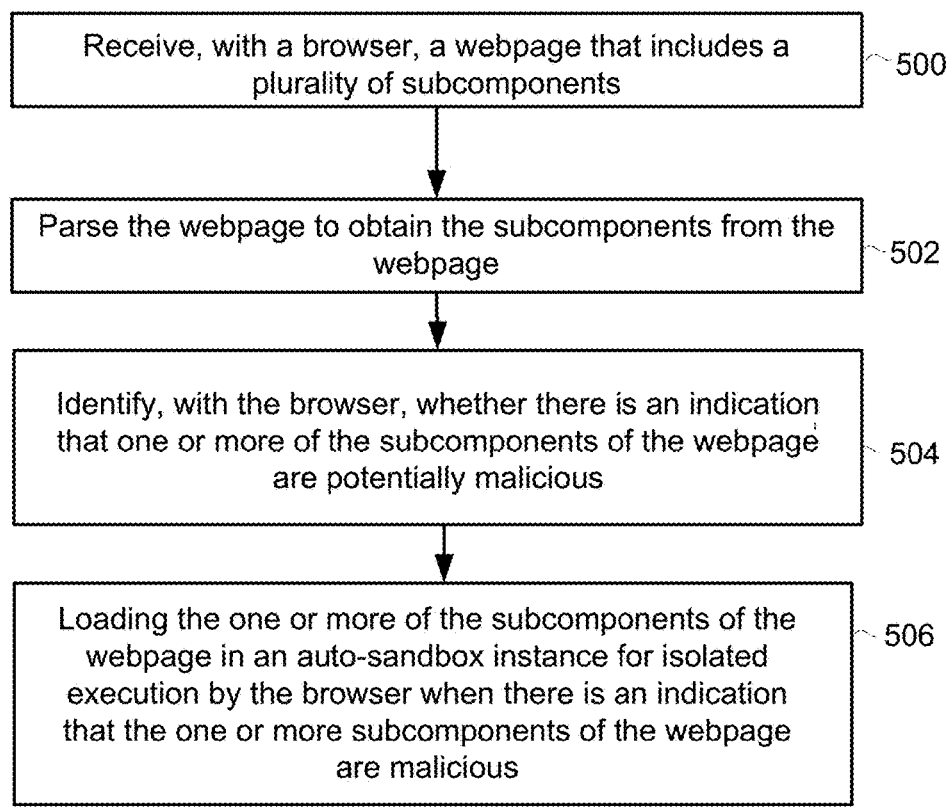
FIG. 5 is a flowchart that depicts a method that may be carried out in connection with the embodiments described with reference to FIGS. 1-4.

Referring next to FIG. 5, it is a flowchart depicting a method that may be traversed in connection with the embodiments described with reference to FIGS. 1-4. As shown, initially the browser 101 receives a webpage that includes a plurality of subcomponents (Block 500). As described above, the subcomponents may be sub-frames of the webpage and/or other objects that make up a webpage such as JavaScripts. The webpage is then parsed to obtain the subcomponents from the webpage (Block 502). The browser 101 then identifies whether there is an indication that one or more of the subcomponents of the webpage are potentially malicious (Block 504).

The detection of potential threats may include the utilization of known techniques such as maintaining a list of URLs that are known to include malicious objects, but unlike prior threat protection approaches, in the embodiments disclosed herein the threat detection is carried out within the browser in an automatic manner that is seamless to the user. In many embodiments, the auto-sandbox module 108 may automatically set sandbox security levels and privileges based on the level of threat posed by the webpage. Threat notifications may be received from multiple detection sources in the detection components 110, 210 such as cross-site scripting (XSS) auditor, canvas fingerprint detector, cookie tracking detector, etc. Security is provided without shifting responsibility to the users so that a secure browsing experience is provided without the hassles associated with prior art threat protection approaches.

When there is an indication that the one or more subcomponents of the webpage are malicious, then one or more of the subcomponents of the webpage are loaded in an auto-sandbox instance for isolated execution by the browser (Block 506). Beneficially, the sandbox filter 104 and the auto-sandbox module 108 are implemented as a part of the browser 101 so that threats are detected and prevented, at the user-space level, from posing a threat to the vulnerabilities 114. Moreover, sub-frames (e.g., potentially-malicious sub-frames) within a website may be sand-boxed independent of the main-frame.

As discussed above, the auto-sandbox module 108 may grant or revoke permission for specific URL schemes (e.g., http, https, ws, file://, etc.); access to local HTTP cache on a computing device; for popups and open URLs in new tab/window; to read/write cookies; to access browsing history; for just-in-time (JIT) compilation of JavaScript; for HTML5 storage (Session, Local, Database and IndexedDB); for device APIs (including but not limited to vibration, battery status, HTML media capture, proximity, ambient light, network service discovery, and wake lock); access to geolocation data; to Web performance APIs (e.g., timing and high resolution timer); to WebRTC APIs (media capture, mediastream, recording and capture, screen capture, etc.); to download contents into the computing device; to handle wireless telephony applications intents (e.g., to dial, make calls, and send dual tone multi frequency tones); and to link market app store (e.g. GOOGLE play store).

In conclusion, embodiments disclosed herein automatically sandbox webpages or portions (e.g., sub-frames) of webpages when there is an indication that the webpage (or its subcomponents) presents a threat. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for processing web content on a computing device, the method comprising:
   receiving a webpage with a browser;
   parsing the webpage with the browser to obtain subcomponents from the webpage;
   monitoring access points that are incoming to the browser for user activity on the computing device while the webpage is composited and displayed for the user on the computing device;
   monitoring access points from the browser to an operating system of the computing device to detect pull requests while the webpage is composited and displayed for the user on the computing device;
   identifying, with the browser, whether there is an indication that one or more subcomponents of the webpage associated with the user activity and pull requests are potentially malicious; and
   loading the one or more of the subcomponents of the webpage in an auto-sandbox instance for isolated execution by the browser when there is the indication that the one or more subcomponents of the webpage are malicious;
   loading subcomponents of the webpage, other than the one or more of the subcomponents, outside of the auto-sandbox instance for non-isolated execution by the browser; and
   displaying content from the isolated execution and the non-isolated execution simultaneously on a display of the computing device.

2. The method of claim 1, wherein identifying whether there is an indication that the one or more subcomponents of the webpage are potentially malicious includes identifying a potentially malicious sub-frame of the webpage; and
loading the potentially-malicious sub-frame into the auto-sandbox instance for isolated execution of the webpage.

3. The method of claim 2 including:
loading benign subcomponents into a non-isolated memory space for unfiltered execution so the benign subcomponents are not isolated while executed and the potentially-malicious sub-frame is isolated while executed.

4. The method of claim 1 including:
intercepting, with the browser, operating system calls made by the one or more subcomponents of the webpage to prevent access to a vulnerable portion of the computing device.

5. The method of claim 4, wherein identifying whether there is an indication that the one or more subcomponents of the webpage are potentially malicious includes identifying a system call from a third party subcomponent.

6. The method of claim 1, wherein identifying whether there is an indication that one or more subcomponents of the webpage are malicious includes analyzing outputs of a plurality of detection modules incorporated with the browser.

7. A computing device comprising:
a transceiver configured to transmit a request for a webpage and to receive the webpage;
a display to display content of the webpage;
a web browser configured to receive the webpage and prepare a composite view of the webpage for display to a user, the web browser comprising:
a parser configured to parse the webpage to obtain subcomponents from the webpage;
a platform application programming interface (API) configured to provide plurality of entry points to access services and receive events;
at least one detection component configured to generate an indication that one or more subcomponents of the webpage are potentially malicious;
a sandbox filter disposed to intercept calls made by subcomponents of the webpage to the platform API, and the sandbox filter is configured to:
expose interfaces to the detection component to enable the detection module to receive browser activity information;
monitor access points that are incoming to the browser for user activity on the computing device while the webpage is composited and displayed for the user on the computing device;
monitor access points from the browser to an operating system of the computing device to detect pull requests while the webpage is composited and displayed for the user on the computing device; and
an auto-sandbox module configured to:
load the one or more of the subcomponents of the webpage in an auto-sandbox instance for isolated execution by the browser when there is the indication that the one or more subcomponents of the webpage are malicious;
load subcomponents of the webpage, other than the one or more of the subcomponents, outside of the auto-sandbox instance for non-isolated execution by the browser; and
displaying content from the isolated execution and the non-isolated execution simultaneously on the display.

8. The computing device of claim 7, wherein the parser includes:
a hypertext markup language (HTML) parser to parse HTML;
JavaScript parser and interpreter to parse and execute JavaScripts;
an XML parser; and
a CSS parser.

9. The computing device of claim 7, wherein the detection component includes a plurality of detection modules, each of the detection modules provides an output to provide the detection component with a plurality of outputs;
wherein the auto-sandbox module receives the outputs from the detection component and loads the one or more of the subcomponents of the webpage in an auto-sandbox instance for isolated execution based upon the outputs.

10. The computing device of claim 7, wherein the detection component includes detection components selected from the group consisting of a finger printing detector, an ever-cookie detector, an XSS detector, a malicious website list, and a behavior-based malicious website detector.

11. The computing device of claim 7, wherein the auto-sandbox module is configured to load a sub-frame of the webpage in an auto-sandbox instance for isolated execution and load benign subcomponents of the webpage into a non-isolated memory space for unfiltered execution so the benign subcomponents are not isolated while executed and the potentially-malicious sub-frame is isolated while executed.

12. A non-transitory, tangible computer readable storage medium, encoded with processor readable instructions to perform a method for processing web content on a computing device, the method comprising:
receiving a webpage with a browser;
parsing the webpage with the browser to obtain subcomponents from the webpage;
monitoring access points that are incoming to the browser for user activity on the computing device while the webpage is composited and displayed for the user on the computing device;
monitoring access points from the browser to an operating system of the computing device to detect pull requests while the webpage is composited and displayed for the user on the computing device;
identifying, with the browser, whether there is an indication that one or more subcomponents of the webpage associated with the user activity and pull requests are potentially malicious; and
loading the one or more of the subcomponents of the webpage in an auto-sandbox instance for isolated execution by the browser when there is the indication that the one or more subcomponents of the webpage are malicious;
loading subcomponents of the webpage, other than the one or more of the subcomponents, outside of the auto-sandbox instance for non-isolated execution by the browser; and
displaying content from the isolated execution and the non-isolated execution simultaneously on a display of the computing device.

13. The non-transitory, tangible computer readable storage medium of claim 12, wherein identifying whether there is an indication that the one or more subcomponents of the webpage are potentially malicious includes identifying a potentially-malicious sub-frame of the webpage; and loading the potentially-malicious sub-frame into the auto-sandbox instance for isolated execution of the webpage.

14. The non-transitory, tangible computer readable storage medium of claim 13, wherein the method includes loading benign subcomponents into a non-isolated memory space for unfiltered execution so the benign subcomponents are not isolated while executed and the potentially-malicious sub-frame is isolated while executed.

15. The non-transitory, tangible computer readable storage medium of claim 12, the method including:

intercepting, with the browser, operating system calls made by the one or more subcomponents of the webpage to prevent access to a vulnerable portion of the computing device.

16. The non-transitory, tangible computer readable storage medium of claim 15, wherein identifying whether there is the indication that one or more subcomponents of the webpage are potentially malicious includes identifying a system call from a third party subcomponent.

17. The non-transitory, tangible computer readable storage medium of claim 16, wherein identifying whether there is the indication that one or more subcomponents of the webpage are malicious includes analyzing outputs of a plurality of detection modules incorporated with the browser.

* * * * *